(12) United States Patent
Monsarrat

(10) Patent No.: US 12,263,407 B1
(45) Date of Patent: Apr. 1, 2025

(54) REAL WORLD WALKING TO CONTROL SUPERHUMAN VIRTUAL WORLD MOVEMENT

(71) Applicant: Monsarrat, Inc., Santa Monica, CA (US)

(72) Inventor: Jonathan Monsarrat, Santa Monica, CA (US)

(73) Assignee: Monsarrat, Inc., Santa Monica, CA (US)

( * ) Notice: Subject to any disclaimer, the term of this patent is extended or adjusted under 35 U.S.C. 154(b) by 0 days.

(21) Appl. No.: 18/887,260

(22) Filed: Sep. 17, 2024

(51) Int. Cl.
*A63F 13/65* (2014.01)
*A63F 13/216* (2014.01)

(52) U.S. Cl.
CPC ............ *A63F 13/65* (2014.09); *A63F 13/216* (2014.09)

(58) Field of Classification Search
CPC ............................... A63F 13/65; A63F 13/216
See application file for complete search history.

(56) References Cited

U.S. PATENT DOCUMENTS

| | | | |
|---|---|---|---|
| 10,521,962 B1 | 12/2019 | Nussbaum et al. | |
| 11,112,250 B1 | 9/2021 | Monsarrat | |
| 11,430,187 B1 | 8/2022 | Monsarrat | |
| 11,776,206 B1* | 10/2023 | Gupta | G06T 17/05 345/419 |
| 2002/0090985 A1* | 7/2002 | Tochner | A63F 13/822 463/9 |
| 2005/0049022 A1* | 3/2005 | Mullen | A63F 13/79 463/1 |
| 2005/0216181 A1 | 9/2005 | Estkowski et al. | |
| 2009/0005140 A1* | 1/2009 | Rose | A63F 13/56 463/40 |
| 2010/0259610 A1* | 10/2010 | Petersen | G06Q 30/02 382/106 |
| 2011/0009241 A1* | 1/2011 | Lane | G06F 3/011 482/8 |
| 2011/0102459 A1* | 5/2011 | Hall | A63F 13/812 345/633 |
| 2011/0208425 A1 | 8/2011 | Zheng et al. | |
| 2012/0100911 A1* | 4/2012 | Rejen | A63F 13/52 463/31 |
| 2013/0339098 A1 | 12/2013 | Looman et al. | |
| 2014/0171962 A1 | 6/2014 | Kang | |
| 2014/0221090 A1* | 8/2014 | Mutschler | A63F 13/211 463/31 |

(Continued)

FOREIGN PATENT DOCUMENTS

| | | |
|---|---|---|
| EP | 3839699 A1 | 6/2011 |
| WO | 2013074997 A1 | 5/2013 |

*Primary Examiner* — Justin L Myhr
*Assistant Examiner* — Carl V Larsen
(74) *Attorney, Agent, or Firm* — David J. Thibodeau, Jr.; VLP Law Group LLP

(57) ABSTRACT

Methods and systems for a virtual experience where a user holds or wears a computer device that displays a virtual world, and the user's physical movement is used to control a virtual avatar through that virtual world in a heightened way. For example, by simply walking around, the user may control a fast moving virtual airplane. A simulation system reads user location information from a sensor in the computer device, and feeds that into a matrix of movement rules. That changes the location data of the user avatar and viewpoint in the virtual world, as shown on the computer device.

11 Claims, 10 Drawing Sheets

Simulation System to Calculate Superhuman Virtual Movement from Real World Movement

(56) References Cited

U.S. PATENT DOCUMENTS

| | | | |
|---|---|---|---|
| 2015/0097864 A1* | 4/2015 | Aniz | G06F 3/04815 |
| | | | 345/633 |
| 2015/0209664 A1* | 7/2015 | Haseltine | G06F 3/011 |
| | | | 463/31 |
| 2016/0004335 A1 | 1/2016 | Hosenpud | |
| 2016/0232713 A1* | 8/2016 | Lee | G06F 3/011 |
| 2016/0232715 A1* | 8/2016 | Lee | G06F 3/011 |
| 2017/0068323 A1* | 3/2017 | West | G06F 3/04815 |
| 2017/0255256 A1* | 9/2017 | Kim | G09G 5/003 |
| 2017/0263032 A1 | 9/2017 | Cricri et al. | |
| 2018/0033204 A1* | 2/2018 | Dimitrov | G06T 15/20 |
| 2018/0345129 A1 | 12/2018 | Rathod | |
| 2019/0019378 A1* | 1/2019 | Greiner | G03B 17/54 |
| 2019/0033960 A1* | 1/2019 | Ho | A63F 13/42 |
| 2019/0073832 A1 | 3/2019 | Kim | |
| 2019/0180509 A1 | 6/2019 | Laaksonen et al. | |
| 2019/0240568 A1* | 8/2019 | Routhier | A63F 13/537 |
| 2019/0265055 A1 | 8/2019 | Chen et al. | |
| 2019/0301953 A1* | 10/2019 | Harvey | G01L 5/047 |
| 2020/0049522 A1 | 2/2020 | Wang et al. | |
| 2020/0133618 A1 | 4/2020 | Kim | |
| 2020/0184221 A1* | 6/2020 | Alexander | G06V 20/13 |
| 2020/0279407 A1* | 9/2020 | Liljeroos | G06T 15/20 |
| 2020/0284416 A1* | 9/2020 | Greiner | F21V 23/0478 |
| 2020/0294350 A1* | 9/2020 | Soon-Shiong | G07F 17/3288 |
| 2020/0341541 A1* | 10/2020 | Olah-Reiken | G06F 3/011 |
| 2020/0384351 A1* | 12/2020 | Asano | G06F 3/0481 |
| 2021/0201581 A1 | 7/2021 | Xie et al. | |
| 2023/0277943 A1* | 9/2023 | Heged?s | A63F 13/655 |
| | | | 463/9 |
| 2024/0019935 A1* | 1/2024 | Kondo | G06F 3/016 |
| 2024/0316461 A1* | 9/2024 | Crosby | A63F 13/65 |

\* cited by examiner

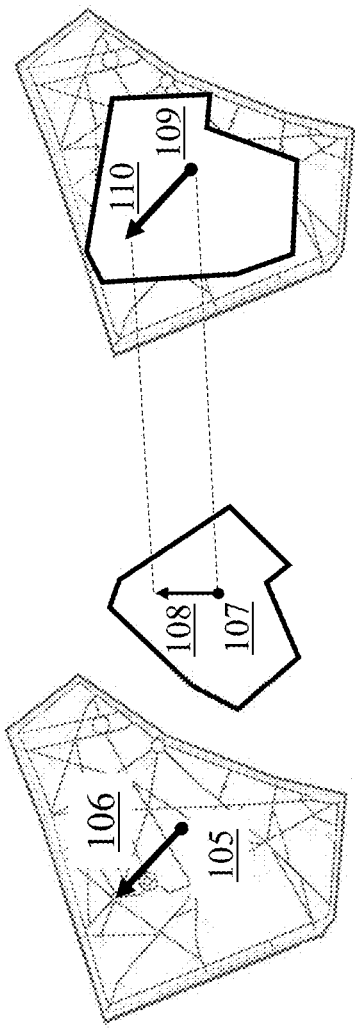
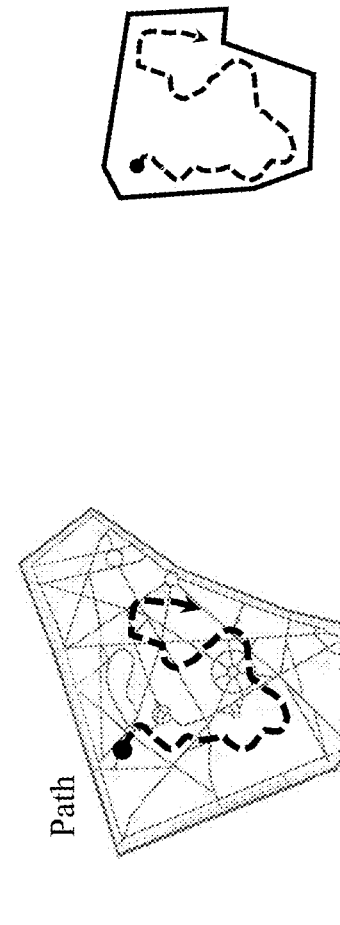
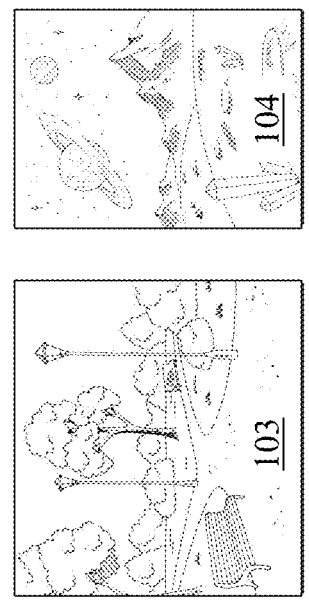

Other Translations

Z-Axis Rotation

Forward X-Axis Translation

Y-Axis Rotation

No Movement

X-Axis Rotation

Car Avatar

Acrobat Avatar

Flying Avatar

Skiing Avatar

Airplane Avatar

Jump ↑
Super Speed Avatar

Simulation System to Calculate Superhuman Virtual Movement from Real World Movement Example Movement of the User's Virtual Viewpoint Permitted Movements of the User's Virtual Viewpoint Y-Axis Avatar Rotation X-Axis Avatar Rotation

| Real World Motion | Virtual Avatar Motion | Notes |
|---|---|---|
| Positive X-Axis Translation | Accelerate or decelerate X-Axis translation to match a speed proportional to walking speed. | Ignore input speeds above some maximum. Input speeds below a minimum stalls the plane. |
| Negative X-Axis Translation | Brakes the plane's momentum. | Do not allow reverse plane movement. |
| Y-Axis and Z-Axis Translation | Banks the plane. | Awkward movements are not a preferred input. |
| X-Axis Rotation | Begin to bank the plane left or right, stopping when its tilt angle matches the user orientation. | Spin the plane avatar, not the ground plane, on the mobile device screen, to prevent the user feeling off-balance in the real world. |
| Y-Axis Rotation | Accelerate or decelerate banking the plane up or down. | Ignore input rotations beyond what's comfortable for the real world user's wearable or mobile device to tilt. |
| Z-Axis Rotation | Begin to bank the plane left or right and stop when its heading matches the user orientation. | |

Example Matrix of Movement Rules for an Airplane Avatar

Fig. 7

The User Outpaces the Forward Motion of the Avatar

Tile the Sample to Create a Virtual Landscape
Resembling the Real World Landscape Take a Visual Sample
of the Real World Camera View

REAL WORLD WALKING TO CONTROL SUPERHUMAN VIRTUAL WORLD MOVEMENT

TECHNICAL FIELD

This patent application relates to a Location-Based Experience (LBE) where a user makes superhuman movements in a simulated virtual world simply by walking through the real world.

BACKGROUND

Simulation systems that present a virtual world are key to video games, data visualization, and other fields, engaging a user's senses of sound and vision. But they traditionally ignore the user's sense of proprioception, the body's innate sense of its own movement. That's why virtual reality (VR) headsets are considered an improvement over tapping on a keyboard and making small mouse movements. You're still sitting in a chair, but physically moving your head in a VR headset to look around feels more immersive.

More recently, augmented reality simulation systems give an even greater immersive feeling, by allowing users to stand up and physically walk around to navigate a virtual world. As one example, see U.S. Pat. No. 11,112,250B1 entitled "System for automatic instantiation of a generically described location-based travelling experience to specific map coordinates and real-time conditions" assigned to Monsarrat, Inc., the assignee of the present application, the entire contents of which are hereby incorporated by reference. In that patent, a user's position and orientation in the real world is tracked by a device such as a mobile phone or Augmented Reality (AR) headset. A simulation system maintains a correlation vector that maps a virtual world space onto a real world space. The resulting Location Based Travel Experience (LBTE) is such that when the user walks one step forward in the real world, the mobile device senses this and the correlation vector is applied to move the user's avatar one step forward in the virtual world.

The user's movement are both a type of control input into the virtual world, and also a new type of "output", where your proprioceptive sense of physically moving, and the heightened body chemistry you get from a little exercise, becomes part of the immersive experience (suspension of disbelief) that you are navigating a virtual world. Haptic feedback may also form part of the output of the simulation system.

This works well when the real user's walking in the real world is perfectly matched to a user avatar walking in a virtual world. But it doesn't work when the user avatar needs to move in virtual ways that cannot match what the user is capable of in the real world. For example, no human in the real world is going to leap tall buildings as a control input to a virtual superhero. And superhuman virtual movements, for example flying an airplane upside down, such that the virtual world appears upside down, may work for a user seated in a chair with a static computer monitor, but won't work for a real world user trying to maintain his or her sense of balance while walking.

SUMMARY OF PREFERRED EMBODIMENTS

A new type of simulation system is needed where simple real world movements such as walking are a control input into, and a type of "output" from, superhuman virtual world experiences.

More particularly, described herein is a simulation system that enables a user to navigate a virtual space in a superhuman way, simply by holding or wearing a mobile device that tracks the user walking around. The system enables solves the problem where user movements which are necessarily limited to what is possible in the real world are associated with superhuman movements of an avatar in a virtual world. As a result, movements of the avatar in the virtual world can now be quite different from movements that are possible for a normal human. The avatar may represent a superpowered character, a vehicle (such as a race car or airplane), game piece, or some other object in the virtual world having its movements are controlled by, but not necessarily in lock step with the user's movements in the real world.

The simulation system:
1. Moves the user avatar through the virtual world, and
2. Moves the user's viewpoint through the virtual world, which determines which part of the virtual world is shown on the user's mobile device.

A first goal is to make the real world control movements feel intuitive as an input to the simulation system. Like a child running with a toy car, the user should be able to simply walk straight ahead, walk while turning, or come to a stop, and optionally move the mobile device. Walking sideways or backwards will feel awkward and should not be required as control inputs.

A second goal is to make the virtual world movements feel intuitive to the type of user avatar. A person walking can stop on a dime, but a user avatar that is a virtual airplane can't do that. So if the user makes abrupt, mismatching real world movements, they need to be ignored or adapted.

The third goal is that the user should not be required to move the device, if held in the hand, in such a way that prevents the user from seeing the device's display, which needs to show the virtual world.

The final goal is to reduce the dissonance between the real world and virtual world. The key is to add limitations to movement of the user viewpoint and user avatar in the virtual world that reduce disorientation.

For example:
 Keep the ground plane of the virtual world parallel to the ground in the real world at all times, so the user in the real world doesn't lose his or her balance.
 Make the user avatar shown on the mobile device face in the same direction as the user viewpoint, so that left/right movements remain intuitive.
 Require the user to continuously walk to propel movement, because if the user just stands still while the virtual world rushes past, that eliminates proprioception from the experience. You might as well be sitting at a desk.

To satisfy these goals, the simulation system defines a series of real world user movement control inputs, and uses a matrix of movement rules to map them to two types of change in the virtual world: the user avatar and the user's viewpoint. The system maximizes the alignments of these two changes, to increase user immersion and decrease dissonance. The matrix of movement rules may also be used in reverse, if something happens in the virtual world which requires the user to perform a real world movement in response, or which triggers real world haptic feedback to the user.

In a specific implementation, a virtual experience method or system operates with a portable electronic device operated by a user. A definition for a virtual space is provided within which the user may navigate using superhuman movements. Such superhuman movements within the virtual space cannot be determined by precisely replicating movements of the user within the physical space.

A relation or correlation is maintained between a virtual coordinate system associated with the virtual space and a physical coordinate system associated with a physical coordinate system or a "real world" space. The portable electronic device provides location data responsive to the estimates of physical location in the real world of the portable electronic device. The location data may include position, orientation, or acceleration information.

The method or system also maintaining two correlate locations associated with the virtual space. These include (a) a user viewpoint, which defines how the virtual space is shown on the portable electronic device, and (b) user avatar, of a type associated with superhuman movements.

The location data is also processed against a matrix of movement rules to thereby determine changes to the user viewpoint and user avatar. The user viewpoint and user avatar are displayed on the portable electronic device.

BRIEF DESCRIPTION OF THE DRAWINGS

FIGS. 1A to 1E show how a virtual world can be correlated with the real world.

FIG. 7 shows a matrix of movement rules relating control inputs to virtual movements.

DETAILED DESCRIPTION OF ILLUSTRATIVE EMBODIMENT(S)

Figure 2C:
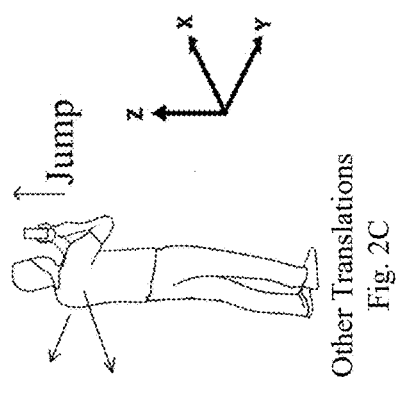
FIGS. 2A to 2F show example real world movements to be used as control inputs.

A description of preferred embodiments follows.
How A Virtual World Can Be Correlated With the Real World The embodiments described herein assume the existence of a technology that provides virtual Location-Based Experiences (LBEs). One example of such a technology was described in the aforementioned U.S. Pat. No. 11,112,250B1. As explained in that patent, an LBE maps virtual user experience locations to real world locations using a graph of location elements, where nodes represent locations, and parent nodes define routes in-between locations and also define location properties to be inherited by child nodes. The location elements may further include map descriptors that refer to map metadata, including metadata; real-time descriptors, including at least whether locations are open or closed, or behavior of other users; experiential descriptors, including whether line-of-sight between locations should be kept or avoided, a mode of transportation users are expected to employ or whether the route needs to be entirely completed within a set time; and nesting and inheritance properties, such that larger LBEs may be assembled from contained smaller LBEs. A route can be laid out by the user physically moving from one location to next location in the real world map and selecting points on the real world map along the route; or by operating a flow based layout model where each node in sequence is automatically placed relative to an initial location, via a graph drawing algorithm that identifies possible location placements relative to element constraints based on a best-fit layout.

The present application is directed to a particular way in which a user avatar and representations of the virtual space are presented on the mobile device.

FIGS. 1A through 1E show how a user may make simple real world movements to navigate a virtual space.

As in FIG. 1A, a User 101 wears or holds a mobile device, personal computer, augmented reality headset, or some other data processor 102 that tracks his or her position and orientation in the real world.

As in FIG. 1B, the user participates in an LBE, or more generally, a "virtual experience", by walking through a Real-World Space 103 while wishing to navigate a Virtual Environment 104 which is visually rendered a computer screen that is part of the User's Device 102.

At given moments in time, as in FIG. 1C, the user will have a Real World Position 105 and a Real World Orientation 106, and possibly other location information such as acceleration. A user viewpoint will also have a Virtual World Position 107, which must be correlated 109 to the real world, and a Virtual World Orientation 108, and possibly other location information such as acceleration, which must also be correlated with the real world.

The most trivial case is described in the prior art patent referenced above: the user walks a Walking Path in the Real World, as in FIG. 1D, that is matched one-to-one with a Walking Path in the Virtual World, as in FIG. 1E.

This invention describes extensions to that prior art, which are referred to as Virtual World Correlation Vectors 109, 110 that let the user control superhuman motion through the virtual world, simply by walking 101 and moving the device 102 in the real world.

Permitted Real World User Control Movements

Figure 2F:
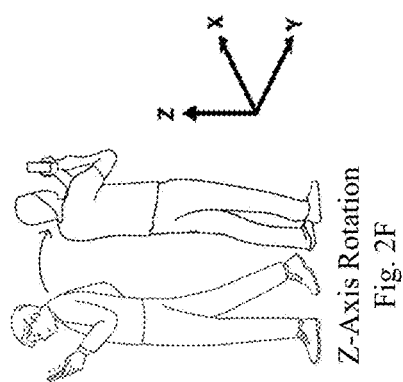
Figure 2B:
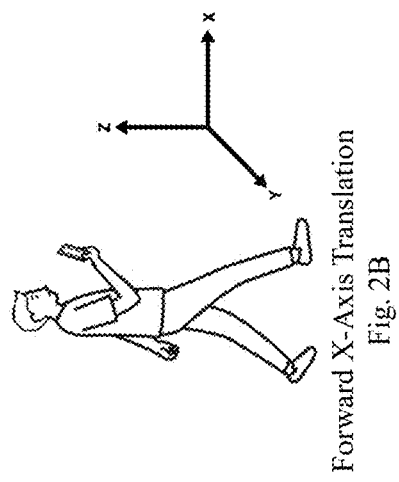
Figure 2E:
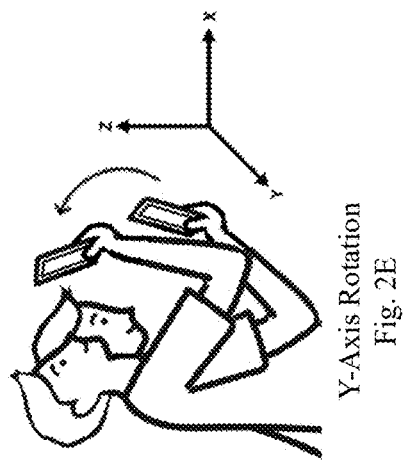
Figure 2A:
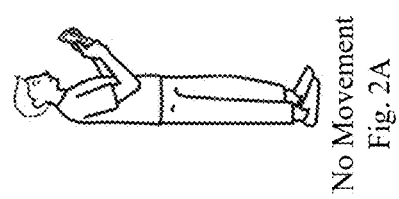

FIGS. 2A to 2F show example real-world movements that form control inputs. The simulation system preferably chooses movements that seem intuitive and that best match the desired superhuman virtual movements:

In FIG. 2A, the user is not moving. This will be jarring if a user avatar is moving through the virtual world. Motion in the virtual world, even though superhuman, should be matched by some type of real world movement. Otherwise, we lose the proprioceptive sense that makes this form of virtual experience more immersive than others.

In FIG. 2B, the user walks straight ahead, which can be considered as a translation motion along an X-Axis. This is a simple, intuitive movement that gives the user a visceral sense of motion, because the user really is moving. Users may start and stop walking abruptly, which may not match desired virtual world motion.

FIG. 2C shows unintuitive motions such as moving sideways, walking backwards, and jumping, that can be considered to be translations along one or more of an X-axis, Y-axis, or Z-axis. Requiring the user to make uncomfortable movements would not be part of most implementations.

Figure 2D:
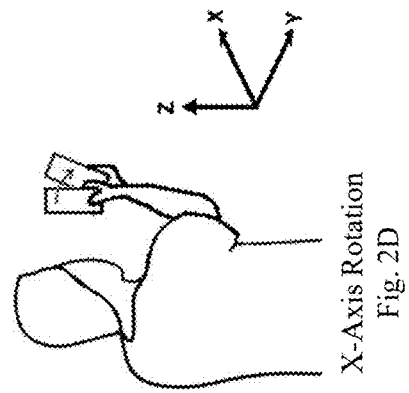

FIGS. 2D and 2E show moving an augmented reality headset or other mobile device 102. These motions can of course be combined with walking.

FIG. 2F shows turning, which can of course also be combined with walking. Users can turn abruptly, which may not match desired virtual world motion.

Example User Avatars and Intended Movements

Figure 3C:
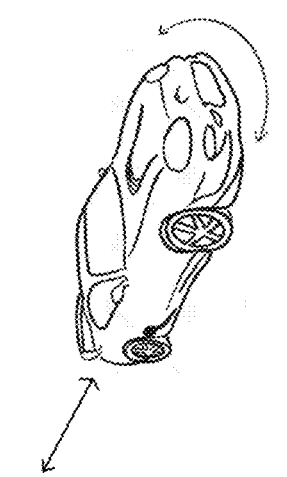
FIGS. 3A to 3F show example user avatars, and their desired virtual world movements.
Figure 3F:
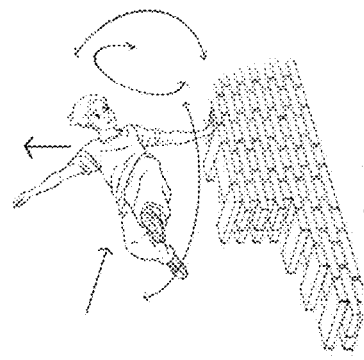
Figure 3B:
Figure 3E:
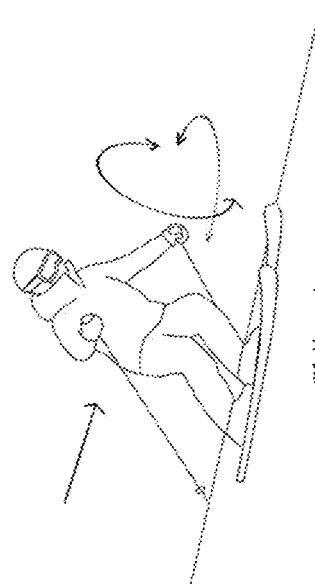
Figure 3A:
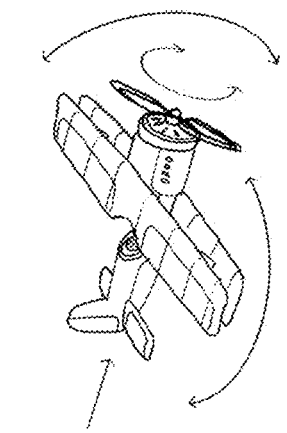

FIGS. 3A to 3F show example virtual avatars and their needed movements. The user's real world movements must be translated into virtual world movements while being constrained, e.g., to ensure that they movements obey the rules of the type of superhuman avatar being simulated:

For example, an airplane avatar, as in FIG. 3A, or flying superhero avatar, as in FIG. 3B, can be permitted to translate forward, but not along other axes, and it cannot start or stop abruptly. It can rotate along all axes, but not "turn on a dime".

A car avatar, as in FIG. 3C, can translate forwards or backwards, but not instantly, and not along other axes, and can only rotate left or right, but not abruptly. The car of course is normally fixed at ground level.

Figure 3D:
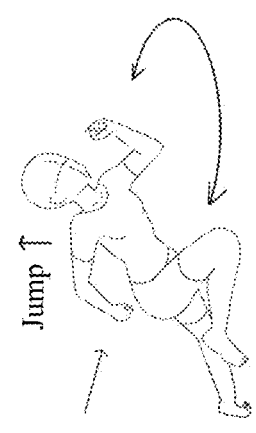

A super speed runner, as in FIG. 3D, can translate forwards, and may start or stop abruptly, and may rotate abruptly or even jump upwards.

A skier, as in FIG. 3E, is similar, but additionally may lean slightly, rotating left or rightwards.

An acrobat, as in FIG. 3F, can move in all directions, is normally fixed to the ground, but may at times leap from the ground while being temporarily fixed to objects, such as the shown hand on a brick wall in a parkour course.

System to Calculate Superhuman Virtual Movement from Real Movement

Figure 4:
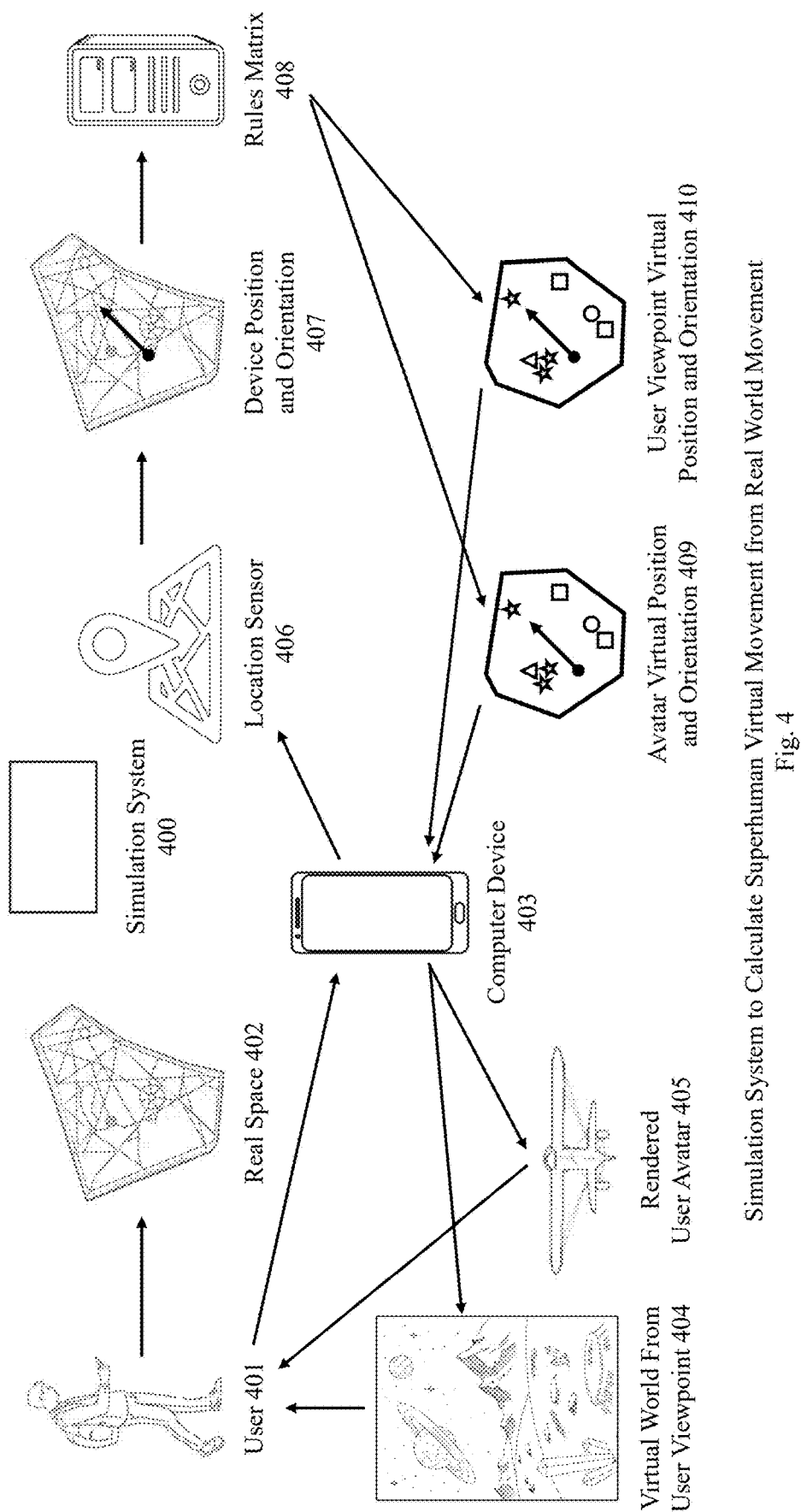
FIG. 4 shows the architecture of the system to control superhuman virtual movement.

FIG. 4 shows the architecture for a simulation system 400 that may be used to implement preferred embodiments.

The Simulation System 400 enables a User 401 to physically walk through a Real World Space 402, holding or wearing a Computer Device 403, and display a Virtual World 404 From a User Viewpoint 404 and display a User Avatar 405 in that Virtual World 404. The Virtual World 404 is mapped (correlated with) the Real World Space 402. The User's 401 movements in the Real World Space 402 control corresponding movements of the User Avatar 405 in the Virtual World 404.

The computer device 403 has one or more Location Sensors 406 that report the Device's Position and Orientation 407, which the simulation system 400 then feeds into a Rules Matrix 408 to calculate changes to the User Avatar Virtual Position and Orientation 409 and the User Viewpoint Virtual Position and Orientation 410. These changes are then rendered on the computer device 403 for the user to see. Output from the computer device could also include haptic feedback or commands for the user to move a specified way.

It should be understood that the Simulation System 400 may be implemented entirely by one or more programmable data processors that are resident within the Computer Device 403. However, in other implementations, the Simulation System 400 may be implemented in whole or in part by one or more data processors that are external to the Computer Device 403, such as servers or cloud computers connected wirelessly to communicate with, exchange data with, and control the Computer Device 403.

Permitted Virtual World Movements of the User Viewpoint

Figure 5B:
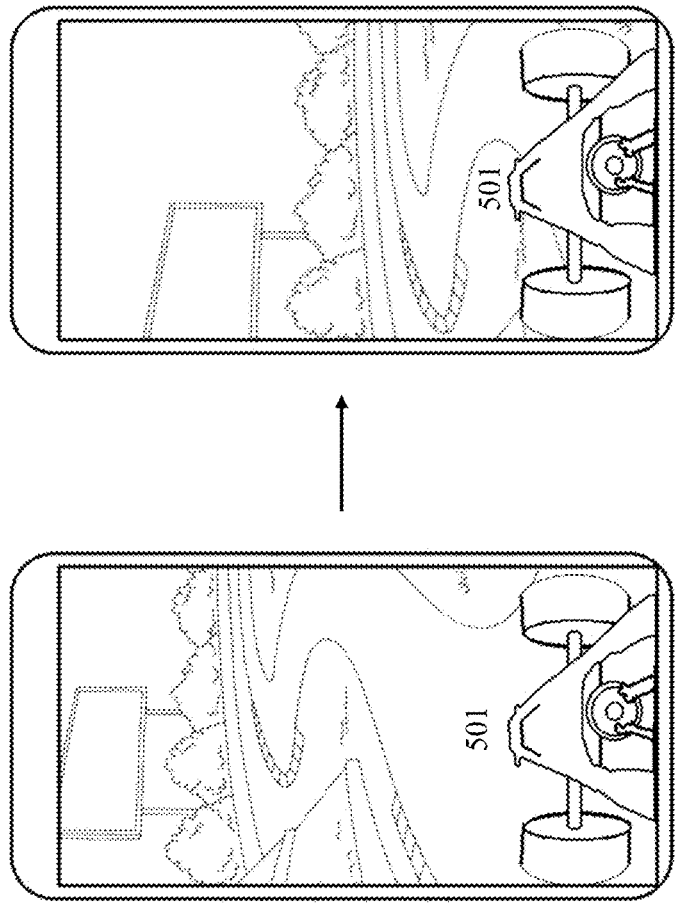
FIGS. 5A to 5B show permitted movements of the user's viewpoint in the virtual world.
Figure 5A:
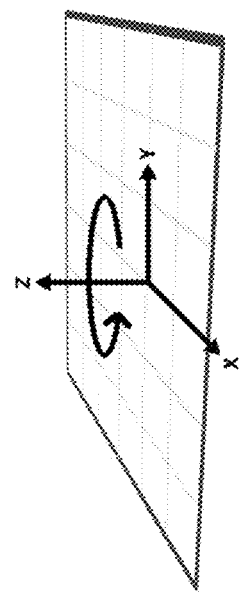

FIGS. 5A to 5B show how the user's viewpoint in the virtual world is permitted to move.

While the user avatar moves in the virtual world, the user's viewpoint may also move. As in FIG. 5A, the user viewpoint is a 3D point in the virtual space and an orientation. To reduce disorientation, the user viewpoint is permitted to translate but not to rotate except along the Z axis. This keeps the ground plane of the real world and the ground plane of the virtual world parallel at all times. Thus the user should not feel off-balance in the real world.

FIG. 5B illustrates a forward movement. Starting from the view of a race track shown on the left side of this figure, a race car avatar 501 and the user viewpoint are moved forward together, so that the avatar 501 appears to stay in the same place on the device as the virtual world comes closer at the viewpoint depicted on the right side of FIG. 5B.

Permitted Virtual World Movements of the User Avatar

Figure 6B:
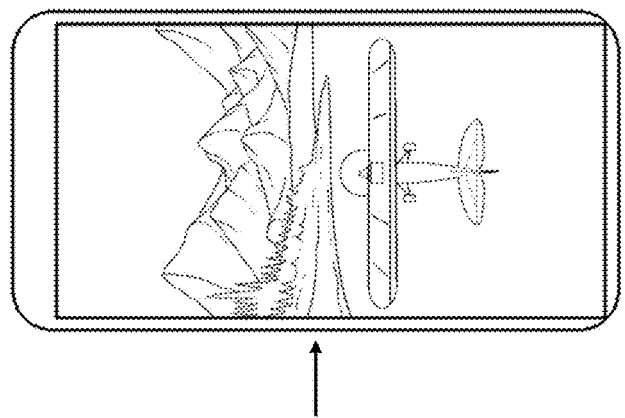
FIGS. 6A to 6B show permitted movements of the user avatar in the virtual world.
Figure 6A:
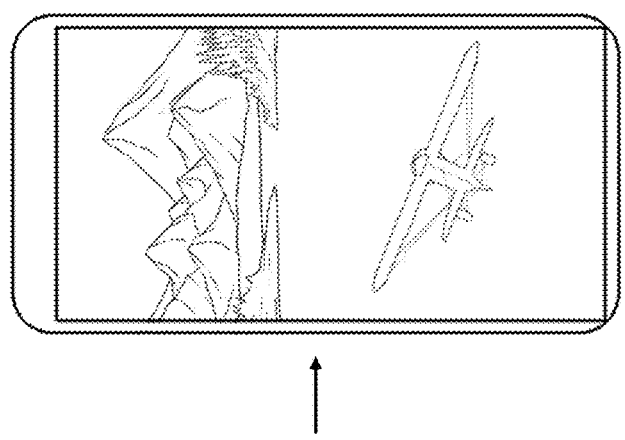

FIGS. 6A to 6B show an example of how a user's avatar in the virtual world is permitted to move.

To rotate the avatar around the X-axis, as in FIG. 6A, or Y-axis, as in FIG. 6B, the virtual world cannot also rotate, because if the virtual ground plane is not kept parallel to the real world ground plane, this will cause the user, standing upright, to be disoriented, off-balance. Instead, the avatar 601 is shown on the user's device to rotate while the virtual world remains fixed.

To rotate the avatar around the Z-axis, the avatar is not shown rotated on the user because that would disturb the user's sense of left and right. Instead, the virtual world itself is shown rotated. When the avatar is translating through the virtual world, the avatar is not shown as moving, but instead the virtual world moves.

In other words, movements of the avatar through the virtual world are shown on the device as either an avatar movement or as a virtual world movement (but not both), whichever is better to reduce disorientation of the user, as the user walks in a real world space.

Matrix of Movement Rules

FIG. 7 shows how a matrix of movement rules can map the user's real world motions to motions of the user avatar in the virtual world, depending on what type of superhuman motion is desired. In this example, the avatar is an airplane. The matrix:

Maximizes the alignment of the real world movement with the proportional user viewpoint and user avatar motions in the virtual world, and Enforces limitations to the user viewpoint, as in FIGS. 5A to 5B.

May optionally work in reverse, giving real world user feedback such as haptics or movement requests on the basis of changes in the virtual world.

The center column lists example constraints. For example, a positive X-axis translation in the real world results in acceleration or deceleration of the virtual avatar, in an amount proportional to the user's walking speed. A negative translation may brake the avatar's momentum. An X-axis rotation may result in banking the avatar left or right, stopping when its tilt angle matches the user orientation. A Y-axis rotation may accelerate banking of the avatar. A Z-axis rotation may also result in banking the plane avatar and stopping when its virtual world orientation matches the user's orientation.

As indicated in the right hand column, other constraints may be appropriate for a given real world motion. For example, a positive X-axis translation above certain speeds may be ignored and speeds below a minimum may result in stalling the plane avatar. A negative translation may not result in reverse movement of the plane. An X-axis rotation may result in spinning the avatar, but not the ground plane. A Y-axis rotation above a certain amount may be ignored. These constraints are now described in more detail.

Proportional Positive X-Axis Translation and "Outpacing"

As in FIG. 2B, the user moves forward along the X-Axis simply by walking straight ahead in the real world.

The user's speed in the real world SR is typically used, for example, by simply multiplying a proportion constant, to calculate a set proportional speed for the airplane avatar in the virtual world, Sv. The airplane avatar smoothly accelerates or decelerates until it reaches Sv.

If the user's speed goes above some maximum limit that is either beyond the airplane avatar's maximum proportional speed, or is an unsafe speed for the real world, that maximum limit is used for SR in calculations.

If the user's speed goes below some minimum limit, or the user stops walking, as in FIG. 2A, the plane may stall and rotate down towards the ground. In this case, the virtual world is not shown as tilted on the user device. The airplane avatar is shown as tilted. The virtual world is always shown as level in this instance, to reduce user disorientation.

A normal experience would be for the user to walk forwards in the real world at a moderate speed. As in FIG. 5B, on the device the avatar and user viewpoint move the same, so, as shown on the user device, the avatar does not appear to move at all and the virtual world "comes towards" the user. This is an intuitive movement: the user moves forward while the virtual world moves past.

The system may also need to handle when the user outpaces the user avatar. For example, if the user immediately starts to run at high speed, the plane's measured acceleration will not allow it to immediately jump to its top virtual speed. Or the user may be running so quickly that he or she is simply going faster in the real world than the plane's proportional top speed, as mapped back into the real world. In this case, keeping the avatar and user viewpoint aligned, as in FIG. 5B, would require the virtual world to seem to move backwards (the user viewpoint to move forwards). Seeing the world appear to move back as the user moves forwards physically would be jarring.

Figure 8:
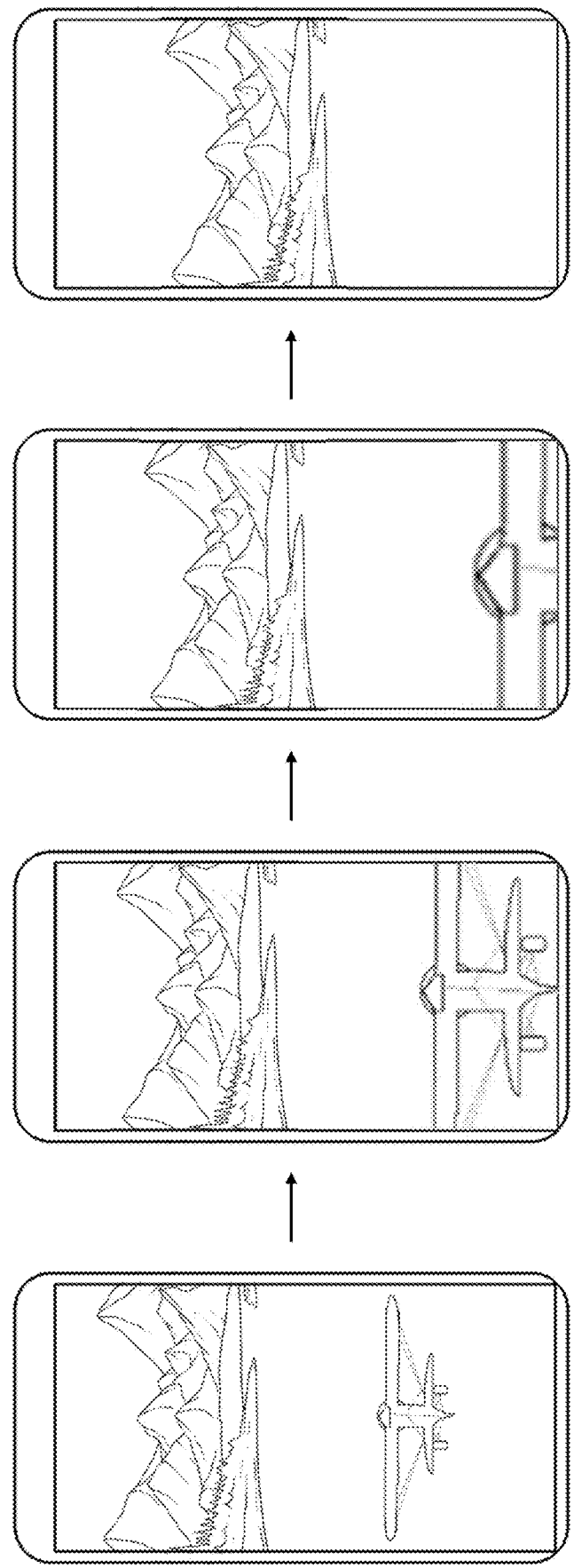
FIG. 8 shows a user moving proportionally too fast for the virtual avatar, "outpacing" it.

So in this case, as in FIG. 8, the system allows the user avatar to "fall behind" the user viewpoint on the device, so that the virtual world can still appear to be "coming towards" the user, or at least keeping pace.

Negative X-Axis Translation

As in FIG. 2C, the user may walk backwards. This has no correlate to airplanes and is an awkward real-world behavior. The simulation system cannot forbid this movement, however, because it has no control over the motions that the user chooses.

So in this case, the result is that the user "outpaces" the avatar in the negative direction. If the system kept the avatar in a static position on the user's device, it would feel to the user as if the aircraft itself were moving backwards. So instead, the system allows the avatar to move out in front of the user. The effect will be similar to that shown in FIG. 8, but with the sequence in time of the views being in the opposite direction that was described in the previous case. That is, the sequence of views of the virtual world would transition from rightmost to leftmost.

Y-Axis Translation

As in FIG. 2C, the user may walk sideways. This also has no correlate to airplanes and is an awkward real-world behavior. The system either banks the airplane left or right into a turn, or allows the avatar to slide off of the user's device screen to the left or right.

Z-Axis Translation

As in FIG. 2C, the user may jump, moving slightly along the Z-Axis in the real world. This also has no correlate to airplanes and the system either banks the plane up, or allows the user to briefly outpace the avatar, moving the avatar higher in the user's device screen. Or perhaps a jump could activate the plane's ejector seat. Crouching down would achieve the opposite effect, either banking the plane down or moving the avatar lower on the user's device screen.

X-Axis Rotation

As in FIG. 2D, the user may rotate the device. The avatar would bank left or right. If the user outpaces the ability of the avatar to bank, then it would be shown smoothly reaching a set point. Otherwise, the avatar itself does not need to change on the user's device screen, because the entire device is being tilted. Meanwhile, to counter that tilt, the virtual world would be tilted opposite, so that the virtual ground plane remains parallel to the real world ground plane, to avoid unbalancing the user.

Y-Axis Rotation

As in FIG. 2E, the user may rotate the device up or down, which creates a "set point". This would smoothly bank the avatar up or down until it achieves this angle, while counter-tilting the virtual world so that the virtual ground plane remains parallel to the real world ground plane.

In addition, the system should not "reward" the user for awkward movements in the real world like trying to look directly upwards. For example, if the user tries to tilt the mobile device being worn or held to an uncomfortable low or high past some limits, the system should not provide any further input to the airplane.

The airplane avatar may also have fixed limits to how tilted up or down it can go. If the user outpaces the airplane's maximum turn speed or maximum angle or orientation, the avatar is allowed to slip off of the user's device screen until it catches up, if ever.

Z-Axis Rotation

As in FIG. 2F, the user may turn left or right.

Similar to the above section, this motion will bank the plane left or right until it reaches the user's orientation as a set point. If the user outpaces the avatar's maximum turning speed, the avatar then rotates away or slides off of the user's device screen to the left or right until it catches up.

How to Display the Avatar's Landscape Backdrop at High Speeds

Figure 9B:
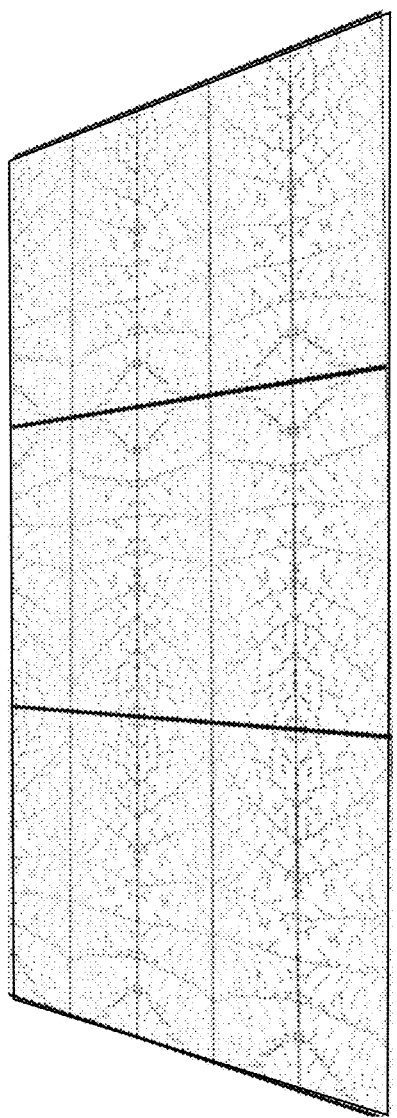
FIGS. 9A and 9B show how to display the avatar's landscape backdrop at high speeds.
Figure 9A:
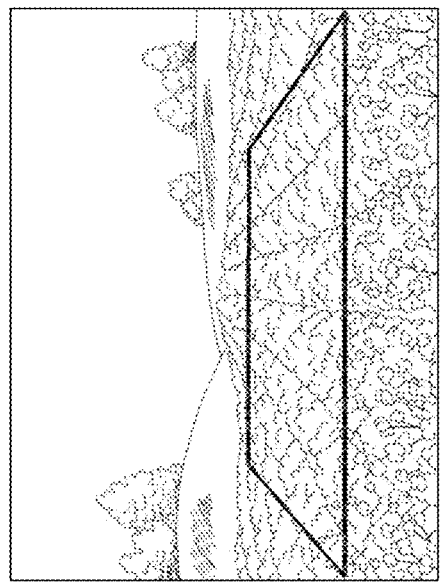

FIGS. 9A and 9B show what to display behind the virtual avatar as a backdrop. Augmented reality experiences often show a real world environment, as seen by the mobile device camera, behind the virtual objects such as the user avatar. This makes the user feel "immersed", as if objects in the virtual world really exist in the real world.

In the system and methods described herein, however, the user avatar in the virtual world moves too quickly to be matched to a real world environment as it passes by the slowly walking real-world user.

The augmented reality simulation system may respond to this challenge by:
  providing an entirely virtual landscape behind the user avatar,
  showing the real world landscape, but adding hints of virtual landscape such as trees to give a sense of faster movement, or
  taking a visual sample of the real world from the device's camera from below the horizon line, as in FIG. 9A, and then making copies of this sample, perhaps mirrored, to tile a "virtual landscape", as in FIG. 9B, which is large enough to whoosh past the user at high relative speed.

Example Method of Operating the Virtual Experience Simulation System

Figure 10:
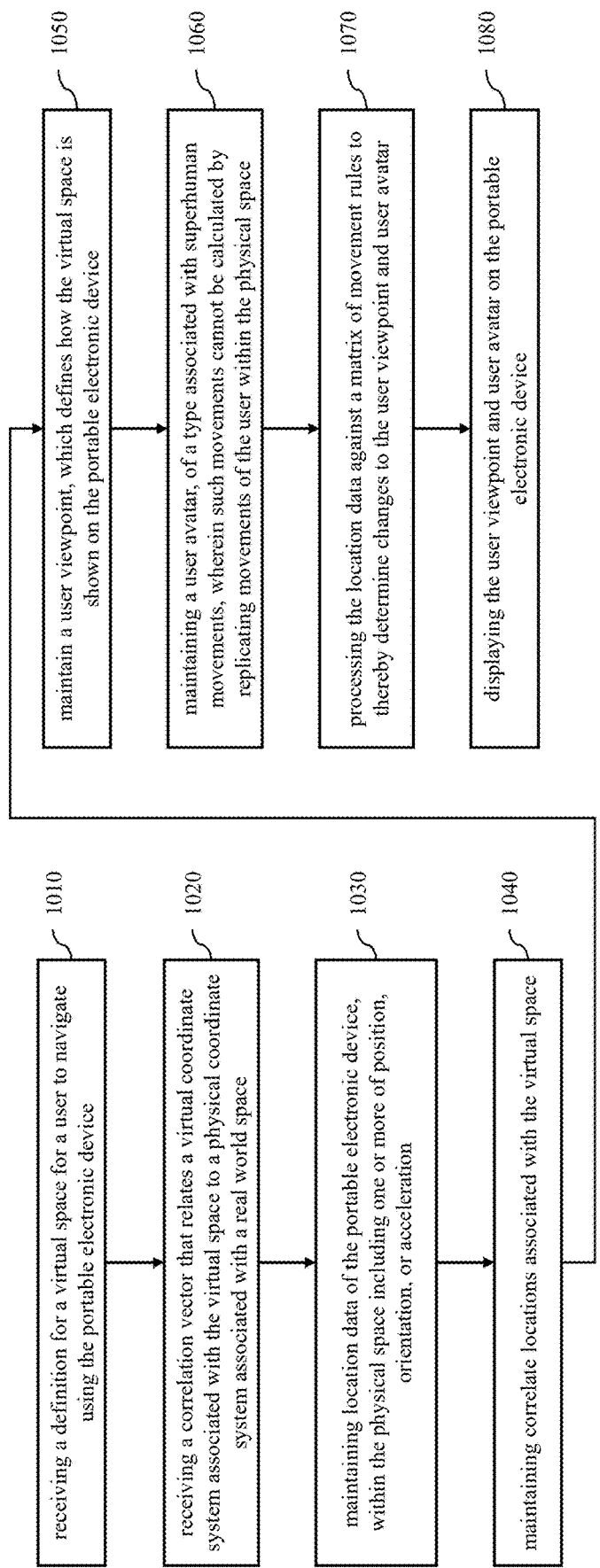
FIG. 10 is a flowchart of an example method of operating a portable electronic device to provide a virtual experience simulation system.

FIG. 10 is a flowchart of an example method of operating a portable electronic device to provide a virtual experience simulation system.

At step 1010, the method is receiving a definition for a virtual space for a user to navigate using the portable electronic device.

At step 1020, the method is receiving a correlation vector that relates a virtual coordinate system associated with the virtual space to a physical coordinate system associated with a real world space.

At step 1030, the method is maintaining location data of the portable electronic device, within the physical space, the location data responsive to the estimates of physical location of the portable electronic device, the location data including one or more of position, orientation, or acceleration.

At step 1040, the method is maintaining two correlated locations associated with the virtual space including. The correlated locations include:

At 1050, a user viewpoint, which defines how the virtual space is shown on the portable electronic device.

At 1060, a user avatar, of a type associated with superhuman movements, wherein such movements cannot be calculated by replicating movements of the user within the physical space.

At step 1070, the method continues operating the virtual experience system, for further processing the location data against a matrix of movement rules to thereby determine changes to the user viewpoint and user avatar.

At step 1080, the method is displaying the user viewpoint and user avatar on the portable electronic device.

OTHER IMPLEMENTATION OPTIONS

The foregoing description, along with the accompanying drawings, sets forth certain specific details in order to provide a thorough understanding of various disclosed embodiments. However, one skilled in the relevant art will recognize that the disclosed embodiments may be practiced in various combinations, without one or more of these specific details, or with other methods, components, devices, materials, etc. In other instances, well-known structures or components that are associated with the environment of the present disclosure, including but not limited to the data processing systems, or wireless communication systems and networks, have not been shown or described in order to avoid unnecessarily obscuring descriptions of the embodiments. Additionally, the various embodiments may be methods, systems, media, or devices. Accordingly, the various embodiments may be entirely hardware embodiments, entirely software embodiments, or embodiments combining software and hardware aspects.

As used herein, the term "or" is an inclusive "or" operator, and is equivalent to the phrases "A or B, or both" or "A or B or C, or any combination thereof," and lists with additional elements are similarly treated. The term "based on" is not exclusive and allows for being based on additional features, functions, aspects, or limitations not described, unless the context clearly dictates otherwise. In addition, throughout the specification, the meaning of "a," "an," and "the" include singular and plural references.

In some instances, the various "data processors" may each be implemented by a physical or virtual general purpose computer having a central processor, memory, disk or other mass storage, communication interface(s), input/output (I/O) device(s), and other peripherals. The general-purpose computer is transformed into the processors and executes the processes described above, for example, by loading software instructions into the processor, and then causing execution of the instructions to carry out the functions described. As is known in the art, such a computer may contain one or more central processing units, disks, various memories, and input/output ports that enable the transfer of information between the elements. The central processor units provide for the execution of computer instructions. One or more memories provide volatile and/or non-volatile storage for these computer software instructions and data used to implement an embodiment. Disks or other mass storage provides non-volatile storage for these computer software instructions and data used to implement, for example, the various procedures described herein. The instructions may therefore typically be implemented in hardware, custom designed semiconductor logic, Application Specific Integrated Circuits (ASICs), Field Programmable Gate Arrays (FPGAs), firmware, software, or any combination thereof. In certain embodiments, the procedures, devices, and processes described herein are a computer program product, including a computer readable medium (e.g., a removable storage medium such as one or more DVD-ROM's, CD-ROM's, diskettes, tapes, etc.) that provides at least a portion of the software instructions for the system.

It also should be understood that the block and system diagrams may include more or fewer elements, be arranged differently, or be represented differently. But it further should be understood that certain implementations may dictate the block and network diagrams and the number of block and network diagrams illustrating the execution of the embodiments be implemented in a particular way.

It is understood by those skilled in the art that various changes in form and details may be made therein without departing from the legal scope of this patent as encompassed by the appended claims.

The invention claimed is:

1. A method of interaction between a portable electronic device and a virtual experience simulation system, the method performed by at least one processor within the portable electronic device, and the method comprising:

a) receiving a definition for a virtual space for a human user to navigate using the portable electronic device;

b) receiving a correlation vector that relates a virtual coordinate system associated with the virtual space to a physical coordinate system associated with a physical space in a real world, wherein the correlation vector does not depend on the human user identifying any particular object;

c) maintaining location data of the portable electronic device, within the physical space, using data provided from at least one of a camera or location sensor associated with the portable electronic device, the location data responsive to estimates of physical location of the portable electronic device, the location data including at least a position of the electronic device within the physical space;

d) maintaining two correlate locations associated with the virtual space including:

i. a user viewpoint, which defines how the virtual space is shown on the portable electronic device; and ii. a user avatar, of a type associated with superhuman movements, wherein such superhuman movements of the user avatar cannot be calculated by replicating movements of the human user as detected from the estimates of physical location of the portable electronic device-within the physical space;

e) operating the virtual experience system, for further processing the location data against a matrix of movement rules to thereby determine changes to the user viewpoint and user avatar, wherein the movement rules comprise defining a limit for a maximum rate of change of the user avatar movement in the virtual world, such that movement of the human user in the real world is not always proportional to movement of the user avatar within the virtual world; and f) causing a display, by the portable electronic device, of the user viewpoint and user avatar, such that the correlation vector does not change when the user viewpoint changes.

2. The method as in claim 1 wherein the movement rules comprise a requirement that a ground plane within the virtual space and a ground plane within the physical space must remain parallel on the device display.

3. The method as in claim 1 wherein the movement rules permit real world movements of the user within the physical space to outpace movements of the user avatar within the virtual space, resulting in the user avatar moving in such a way that the user avatar does not have a fixed position on the display.

4. The method as in claim 1 further wherein the movement rules include a requirement that the user viewpoint must have the same orientation in the real world as a virtual world orientation of the user avatar.

5. The method as in claim 1 wherein the movement rules further specify that translation along one or more selected axes results in changing the user viewpoint but not an orientation of the user avatar.

6. The method as in claim 1 wherein the movement rules further specify that translation along one or more selected axes results in changing an orientation of a user avatar but not the user viewpoint.

7. The method of claim 1 wherein the portable electronic device includes a real world sensor, and the virtual experience system is further for creating a virtual landscape from samples taken by the real world sensor of a physical world.

8. The method of claim 1 wherein the movements of the human user comprise walking while holding the portable electronic device.

9. The method of claim 1 wherein the superhuman movement of the user avatar is flying.

10. A method of operating a portable electronic device to provide a virtual experience simulation system, the method comprising:
   a) receiving a definition for a virtual space for a user to navigate using the portable electronic device;
   b) receiving a correlation vector that relates a virtual coordinate system associated with the virtual space to a physical coordinate system associated with a physical space in a real world;
   c) maintaining location data of the portable electronic device, within the physical space, the location data responsive to estimates of physical location of the portable electronic device, the location data including one or more of position, orientation, or acceleration;
   d) maintaining two correlate locations associated with the virtual space including:
      i. a user viewpoint, which defines how the virtual space is shown on the portable electronic device; and
      ii. a user avatar, of a type associated with superhuman movements of the user avatar, wherein such superhuman movements of the user avatar cannot be calculated by replicating movements of the human user detected from estimates of physical location of the portable electronic device within the physical space;
   e) operating the virtual experience system, for further processing the location data against a matrix of movement rules to thereby determine changes to the user viewpoint and user avatar; and
   f) displaying the user viewpoint and user avatar on the portable electronic device; and
   further wherein the device includes a real world camera, and the virtual experience system is further operated for creating a virtual landscape by tiling one or more samples of a physical world landscape from a real world camera view below a horizon.

11. A method of operating a portable electronic device to provide a virtual experience simulation system, the method comprising:
   a) receiving a definition for a virtual space for a user to navigate using the portable electronic device;
   b) receiving a correlation vector that relates a virtual coordinate system associated with the virtual space to a physical coordinate system associated with a physical space in a real world;
   c) maintaining location data of the portable electronic device, within the physical space, using data provided from at least one of a camera or location sensor associated with the portable electronic device, the location data responsive to estimates of physical location of the portable electronic device, the location data including at least an estimate of position with the physical space;
   d) maintaining two correlate locations associated with the virtual space including:
      i. a user viewpoint, which defines how the virtual space is shown on the portable electronic device; and
      ii. a user avatar, of a type associated with superhuman movements of the user avatar, wherein such superhuman movements of the user avatar cannot be calculated by replicating movements of the human user detected from estimates of physical location of the portable electronic device within the physical space;
   e) operating the virtual experience system, for further processing the location data against a matrix of movement rules to thereby determine changes to the user viewpoint and user avatar; and
   f) displaying the user viewpoint and user avatar on the portable electronic device; and
   wherein the virtual experience simulation system further processes the location data for:
      defining one or more location elements, each of which refers to a virtual location not having a defined position within the physical coordinate system;
      generating a graph of the location elements, where nodes represent locations, and parent nodes define one or more routes in-between locations and also define location properties to be inherited by child nodes;
      the location elements further including one or more of:
         map descriptors that refer to map metadata, including metadata about locations within the physical coordinate system;
         real-time descriptors, including at least whether locations are open or closed, or behavior of other users;
         experiential descriptors, including whether line-of-sight between locations should be kept or avoided, a mode of transportation users are expected to employ or whether the one or more routes need to be entirely completed within a set time; and nesting and inheritance, such that larger virtual experience may be assembled from contained smaller virtual experiences;

and the method further comprises:
  laying out a route by one or more of:
  physically moving from one location to next location in the physical coordinate system and selecting points therein for each stop; or
  operating a flow based layout model where each node in sequence is automatically placed relative to an initial location, via a graph drawing algorithm that identifies possible location placements relative to element constraints based on a best-fit layout.

\* \* \* \* \*